US009494315B2

(12) United States Patent
Guillou et al.

(10) Patent No.: US 9,494,315 B2
(45) Date of Patent: *Nov. 15, 2016

(54) CHEMICAL-LOOPING COMBUSTION METHOD WITH ASHES AND FINES REMOVAL AT THE OXIDATION ZONE OUTLET AND PLANT USING SAME

(71) Applicants: TOTAL SA, Courbevoie (FR); IFP Energies nouvelles, Rueil-Malmaison (FR)

(72) Inventors: Florent Guillou, Ternay (FR); Thierry Gauthier, Brignais (FR); Ali Hoteit, Puteaux (FR); Sebastien Rifflart, Paris (FR)

(73) Assignees: TOTAL SA, Courbevoie (FR); IFP ENERGIES NOUVELLES, Rueil-Malmaison (FR)

( * ) Notice: Subject to any disclaimer, the term of this patent is extended or adjusted under 35 U.S.C. 154(b) by 360 days.

This patent is subject to a terminal disclaimer.

(21) Appl. No.: 14/355,858

(22) PCT Filed: Oct. 29, 2012

(86) PCT No.: PCT/FR2012/000441
§ 371 (c)(1),
(2) Date: May 2, 2014

(87) PCT Pub. No.: WO2013/079818
PCT Pub. Date: Jun. 6, 2013

(65) Prior Publication Data
US 2014/0302444 A1  Oct. 9, 2014

(30) Foreign Application Priority Data
Dec. 2, 2011 (FR) .................................. 11 03697

(51) Int. Cl.
*F23C 10/01* (2006.01)
*F23C 10/24* (2006.01)
(Continued)

(52) U.S. Cl.
CPC ............... *F23C 10/01* (2013.01); *F23C 10/10* (2013.01); *F23C 10/24* (2013.01); *F23C 10/28* (2013.01);
(Continued)

(58) Field of Classification Search
CPC combination set(s) only.
See application file for complete search history.

(56) References Cited

U.S. PATENT DOCUMENTS 2,394,710 A * 2/1946 McAfee ................. B01J 8/1881
208/118
3,729,551 A * 4/1973 Gorin ................. C01B 17/0404
423/168
(Continued)

FOREIGN PATENT DOCUMENTS

FR  2556983 A1  6/1985
FR  2850156 A1  7/2004
(Continued)

*Primary Examiner* — Kaity Handal
(74) *Attorney, Agent, or Firm* — Fitch, Even, Tabin & Flannery, LLP

(57) ABSTRACT

The invention relates to a method for chemical-looping combustion of a solid hydrocarbon-containing feedstock, wherein the ashes and fines are removed at the outlet of reactive oxidation zone R1 by sending transported phase (5) coming from reactive zone R1, comprising gas and solid, to a gas-solid separation zone S2, then by sending solid stream (7) coming from gas-solid separation zone S2 to a dense phase elutriation separation zone S3 fluidized by a non-reducing gas (8) allowing the fines and the fly ashes to be separated from the oxygen-carrying material particles. Optionally, deeper separation is carried out in a dedusting zone S5 arranged downstream from dense phase elutriation separation zone S3.

The invention also relates to a chemical-looping combustion plant allowing the method according to the invention to be implemented.

10 Claims, 1 Drawing Sheet

(51) Int. Cl.
*F23C 99/00* (2006.01)
*F23C 10/10* (2006.01)
*F23C 10/28* (2006.01)

(52) U.S. Cl.
CPC .............. *F23C 99/00* (2013.01); *F23C 99/005* (2013.01); *F23C 2900/99008* (2013.01); *Y02E 20/346* (2013.01)

(56) References Cited

U.S. PATENT DOCUMENTS

| | | | | |
|---|---|---|---|---|
| 2007/0124997 A1* | 6/2007 | Liu | ........................ | B01J 8/0055 48/198.7 |
| 2008/0164443 A1* | 7/2008 | White | .................... | B01J 23/002 252/373 |
| 2008/0193349 A1* | 8/2008 | Morin | ...................... | B01J 8/067 422/213 |
| 2009/0072538 A1* | 3/2009 | Morin | ...................... | F02C 3/28 290/52 |
| 2009/0123346 A1* | 5/2009 | Morin | .................... | B01J 8/0055 422/142 |
| 2011/0120560 A1 | 5/2011 | Proll et al. | | |
| 2011/0300060 A1* | 12/2011 | Guillou | .................. | C01B 13/08 423/579 |
| 2011/0303875 A1* | 12/2011 | Hoteit | ....................... | C01B 3/42 252/373 |
| 2012/0134904 A1* | 5/2012 | Sanchez-Molinero | | B01D 53/38 423/219 |
| 2012/0167808 A1* | 7/2012 | Beal | ...................... | F23C 10/002 110/245 |

FOREIGN PATENT DOCUMENTS

| | | |
|---|---|---|
| FR | 2273192 A1 | 1/2011 |
| JP | 64-79504 A | 3/1989 |
| WO | 2010/052415 A2 | 5/2010 |

* cited by examiner

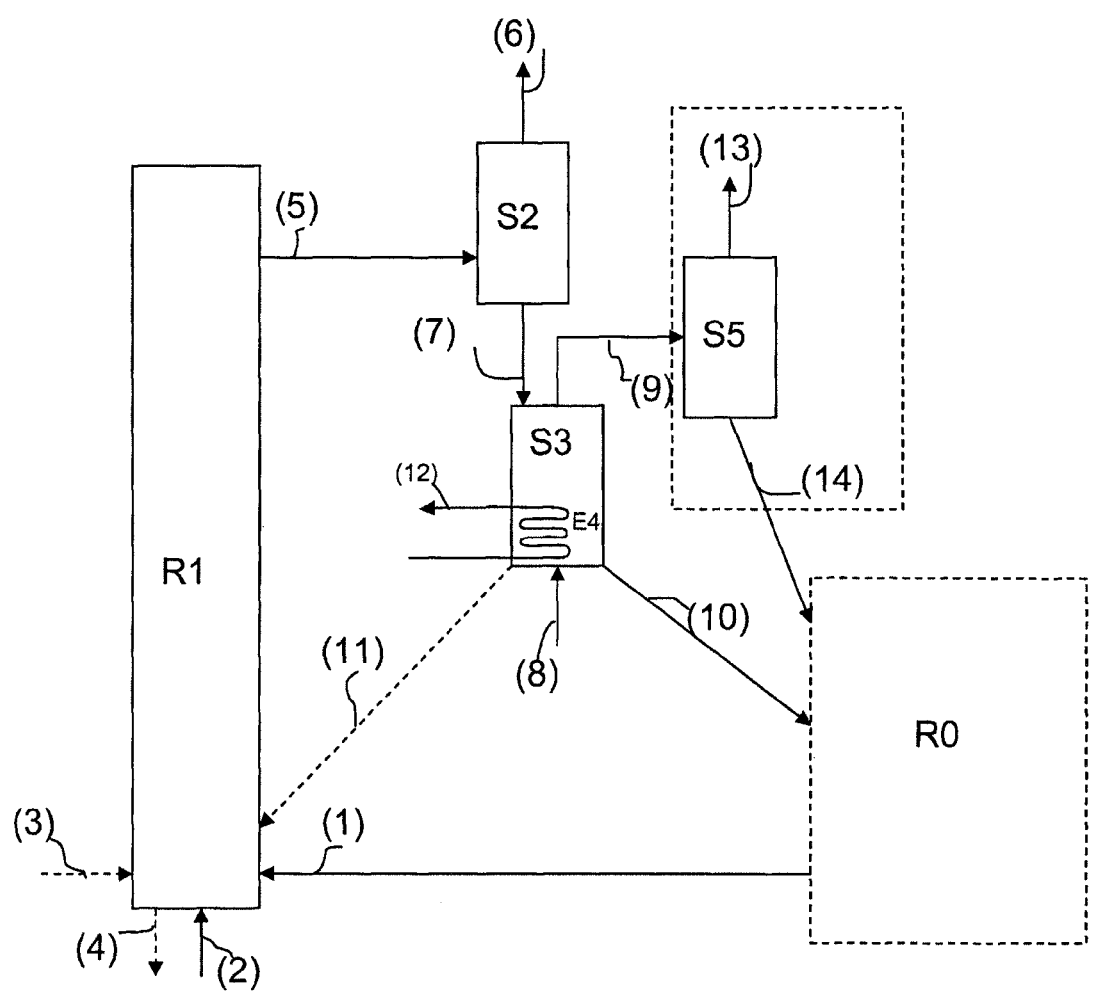

CHEMICAL-LOOPING COMBUSTION METHOD WITH ASHES AND FINES REMOVAL AT THE OXIDATION ZONE OUTLET AND PLANT USING SAME

FIELD OF THE INVENTION

The invention relates to the sphere of chemical-looping redox combustion of solid hydrocarbon-containing feedstocks in order to produce energy, syngas and/or hydrogen.

More particularly, the invention relates to the removal of ashes and fines produced in the chemical-looping combustion plant.

Terminology

Chemical-Looping Combustion or CLC:

In the text hereafter, what is referred to as a CLC (Chemical-Looping Combustion) is a loop oxidation-reduction (redox) process on active mass. It can be noted that, in general, the terms oxidation and reduction are used with regard to the oxidized or reduced state of the active mass respectively. In a chemical-looping combustion plant, the oxidation zone is where the redox mass is oxidized and the reduction zone is where the redox mass is reduced.

Devolatilization

During thermal treatment, the organic compounds lose volatiles, first water and carbon dioxide, liquid and then gaseous hydrocarbons, then carbon oxide and eventually hydrogen. This process is called devolatilization. The devolatilization temperature and the magnitude of the phenomenon depend on the initial organic compound. Thus, for coals of increasing rank, devolatilization occurs at increasingly high temperatures.

Fluidized Bed

In the rest of the description:
what is referred to as a dense fluidized bed is a fluidized bed wherein the gas fraction $\epsilon_g$ is below 0.9, preferably below 0.8,
what is referred to as a dilute fluidized bed is a fluidized bed wherein the volume fraction of metallic oxide particles is below 10 vol. %.

Riser

In the rest of the description, what is referred to as a riser is a vertical enclosure of tubular shape wherein the fluids are subjected to an ascending motion.

BACKGROUND OF THE INVENTION

The Ashes Issue

Chemical-looping combustion is performed using oxygen-carrying materials such as metallic oxides that yield their oxygen in a reduction zone (referred to as "fuel reactor") under suitable operating conditions. Once reduced, the material is carried to an oxidation zone (referred to as "air reactor") where it is reoxidized on contact with an oxidizing gas (such as air or water vapour for example).

More generally, a chemical-looping combustion process comprises one or more reaction zones making up a reduction zone, wherein combustion of a fuel (a hydrocarbon-containing feedstock for example) is carried out by contact with an oxygen-carrying solid that is reoxidized afterwards in at least one oxidation zone by contact with air or water vapour prior to being sent back to the combustion (or reduction) zone(s). The reaction zones allowing chemical-looping combustion reactions to be conducted generally consist of fluidized beds or transported beds.

Chemical-looping combustion (CLC) of solid hydrocarbon feedstocks is a method allowing notably energy (vapour, electricity, etc.) to be produced by recovery of the heat released by the combustion reactions, while producing $CO_2$-rich fumes. It is therefore possible to consider $CO_2$ capture after condensation and compression of the fumes. It is also possible to consider the production of syngas, or even hydrogen, by controlling the combustion and by implementing the required purifications downstream from the combustion process.

In the reaction mechanisms associated with chemical-looping combustion in the reduction zone, it is established that the solid fuel goes through a gasification stage, promoted by the presence of water vapour or of carbon dioxide and by the temperature, then that the gas produced by the gasification stage is oxidized on contact with the oxygen-carrying material. If the solid fuel contains volatiles, the latter devolatilize at least partly on contact with the hot oxygen-carrying material and they are then oxidized thereby. It is also possible, in cases where the oxygen-carrying material naturally releases the oxygen according to the operating conditions, to have direct oxidation of the solid fuel by the gaseous oxygen released by the material in the fuel reactor.

Chemical-looping combustion of solid feedstocks requires severe and compelling operating conditions to be able to conduct the combustion reactions. In order to favour gasification of the fuel, high temperatures generally ranging between 800° C. and 1100° C., preferably between 850° C. and 1000° C., are necessary. The time required for gasification decreases as a function of the temperature and it generally ranges between 30 seconds and 30 minutes. It can therefore be advantageous to perform partial gasification, to separate the non-gasified fuel residue from the effluents and to recycle it. It is thus possible to reach rates of conversion (through gasification) per pass ranging between 50% and 80% in a temperature range between 850° C. and 1000° C., with reaction times ranging between 1 minute and 10 minutes, typically between 3 minutes and 5 minutes. The gasification times can be reduced by increasing the partial oxidizing gas ($H_2O$, $CO_2$) pressure.

Another problem linked with chemical-looping combustion of solid feedstocks relates to the formation of ashes. Indeed, solid fuels have not insignificant mineral material contents and, once combustion of the carbon and of the hydrogen is completed, solid residues called ashes form. Table 1 groups the analyses of two coals A and B by way of example. It can be observed that the ash content of the coals varies according to the origin of the solid feedstock, but this content is not insignificant. It typically represents 5 to 20% of the mass of dry coal. Some solid fuels such as pet coke have much lower ash contents. There are also solid fuels with higher ash contents.

These ashes essentially consist of silicon and aluminium oxide, but they also contain other components, as illustrated by way of example in Table 1.

TABLE 1

Analysis of the various coals

| | | | Coal A | Coal B |
|---|---|---|---|---|
| Dry coal analysis | Ashes | wt. % | 10.3 | 14.8 |
| | Volatiles | wt. % | 37.6 | 24 |
| | Sulfur | wt. % | 0.5 | 0.57 |
| | Specific heat | Kcal/kg | 6710 | 6630 |
| Ultimate analysis | C | wt. % | 71.1 | 73.46 |
| | H | wt. % | 4.77 | 3.87 |
| | N | wt. % | 1.41 | 1.65 |

TABLE 1-continued

Analysis of the various coals

| | | | Coal A | Coal B |
|---|---|---|---|---|
| | S | wt. % | 0.5 | 0.57 |
| | Ashes | wt. % | 10.3 | 14.76 |
| | O (by difference) | wt. % | 11.92 | 5.69 |
| Ashes composition | SiO2 | wt. % | 67 | 49.84 |
| | Al2O3 | wt. % | 19.2 | 40.78 |
| | Fe2O3 | wt. % | 5.2 | 2.9 |
| | CaO | wt. % | 2 | 1.08 |
| | MgO | wt. % | 1.2 | 0.26 |
| | TiO2 | wt. % | 0.9 | 1.96 |
| | K2O | wt. % | 1.7 | 0.64 |
| | Na2O | wt. % | 1.7 | 0.06 |
| | SO3 | wt. % | 0.9 | 0.52 |
| | P2O5 | wt. % | 0.2 | 1.05 |

The ashes resulting from the combustion of the coal are made up of residual fine particles. Their melting point varies according to their composition and it generally ranges between 1000° C. and 1500° C. However, at lower temperatures, for example between 800° C. and 1000° C., it is possible to observe a phenomenon of agglomeration of the ash particles that become sticky. They can therefore either agglomerate with one another, or they agglomerate with the particles of oxygen-carrying material. Considering the operating conditions in the chemical-looping combustion process, two types of ashes can be distinguished:

fly ashes: they correspond to the ashes that are carried into the fuel reactor by the combustion gases, agglomerated ashes: they correspond to the ashes that agglomerate with one another or with the oxygen-carrying material and that are too heavy to be carried into the fuel reactor by the combustion gases.

Fly ashes generally represent 50% to 99% of the ashes formed, typically 70% to 90%. Their grain size is relatively fine with generally at least 25% fines with sizes below 10 microns and 90% fines with sizes below 100 microns. The Sauter mean diameter representative of the fly ash grain size generally ranges between 5 and 30 microns, and it is typically close to 10 microns. The grain density of these ashes generally ranges between 2000 and 3000 kg/m$^3$, and it is generally close to 2500 kg/m$^3$.

The grain size of the agglomerated ashes is more delicate to estimate and depends on the conditions of implementation of the method. In general terms, the grain size of these ashes is estimated to be above 100 microns and their size can reach several millimeters.

Patent application FR-2,850,156 describes a chemical-looping combustion method wherein the solid fuel is crushed prior to being fed to the circulating fluidized-bed reduction reactor so as to allow more complete and faster combustion. The method produces nearly 100% fly ashes that are separated from the circulating oxides. Separation downstream from the circulating bed is first provided by a cyclone, then by a device comprising a bed fluidized by water vapour allowing separation of the unburnt particles from the metallic oxide particles. Entrainment of unburnt particles in the oxidation zone and therefore $CO_2$ emissions in the oxidation reactor effluents is thus avoided. The fly ashes are separated from the oxide particles in a second circuit comprising a fluidized bed separator.

N. Berguerand's thesis "Design and Operation of a 10 kWth Chemical-Looping Combustor for Solid Fuels", ISBN 978-91-7385-329-3, describes a device allowing coal combustion to be conducted using a chemical loop.

This device consists of an oxidation reactor using metallic particles, a cyclone allowing separation of the particles and of the depleted air after oxidation, a fluidized bed supplied with oxidized metallic oxides through the return leg arranged below the cyclone, wherein reduction of the metallic oxide is carried out by combustion of the coal. The coal is fed into the upper part of the dilute phase fluidized bed. In the reduction reactor, combustion of the coal takes place progressively: the coal particles first descend and devolatilize in the dilute phase, countercurrent to the fluidization gases, wherein the metallic oxides are present in small amounts only; then they come into contact with the fluidized metallic oxides in dense phase. The long residence time allows to gasify the coal and to produce combustion gases containing large amounts of carbon monoxide and of hydrogen that pass into the dilute phase.

According to this document, the reduction reactor is equipped with a particle separator integrated in the dense phase, which requires additional gas for the separation. In this system, no specific device allowing separation and discharge of the ashes formed during combustion of the solid feedstocks is provided.

In order to overcome the drawbacks of the two systems described above, the applicants have developed a chemical-looping combustion method allowing, even from coarse fuel particles, to obtain total combustion of the solid feedstock while minimizing the amount of solid feedstock to be recycled, which allows to maximize the energy efficiency of the method. The combustion method according to the invention allows to capture at least 90% of the $CO_2$ emitted by the combustion in the fumes directly at the combustion reactor outlet, the capture rate being defined by the ratio of the amount of $CO_2$ emitted in the fumes coming from the combustion reactor to the amount of $CO_2$ emitted in the chemical-looping combustion process.

At the combustion process outlet, the $CO/CO_2$ molar ratio of the fumes downstream from the cyclones is below 0.05 and the $H_2/H_2O$ ratio is below 0.05. This is achieved, on the one hand, through optimization of the initial contact between the oxygen-carrying particles and the solid fuel so as to promote the coal gasification reactions and, on the other hand, through optimization of the contact between the gasification products and the metallic oxides so as to produce effluents that have undergone total combustion ($H_2$, CO and HC<1 vol. % in the fumes).

Besides, separation of the unburnt fuel particles from the metallic oxide particles is carried out upstream from the reduction reactor fumes dedusting stage so as to best use the maximum kinetic energy of the fumes for separation of the two types of particles.

The chemical-looping method comprises at least:

contacting of the solid feedstock particles in the presence of metallic oxide particles in a first reaction zone operating under dense fluidized bed conditions, combustion of the gaseous effluents from the first reaction zone in the presence of metallic oxide particles in a second reaction zone, separation, within a mixture from the second reaction zone, of the gas, the unburnt particles and the metallic oxide particles in a separation zone, reoxidation of the metallic oxide particles in an oxidation zone prior to sending them back to the first reaction zone.

Downstream from the unburnt and metallic oxide particles separation zone, a dedusting system comprising for example one or more cyclone stages can be provided for separation of the particles carried along in the fumes of the combustion zone of the fuel reactor. The fly ashes are carried along in the fumes to this dedusting system with the unburnt solid fuel particles. In order to maximize the energy efficiency of the plant, it is necessary to recover the main part of the unburnt fuel particles and thus to carry out deep dedusting. This dedusting will then allow to recover the unburnt particles, as well as a large part of the fly ashes that are then recycled to the fuel reactor.

In order to remove the ashes, it is possible to position an enclosure comprising a fluidized bed on the line channeling the particles separated during the dedusting stage so as to eliminate the fly ashes through elutriation. However, this means does not allow to control elutriation of the ashes and elutriation of the unburnt particles separately. In fact, in this case, good elimination of the ashes produced can consecutively be translated into a significant elimination of the unburnt particles and therefore a decrease in the energy efficiency or a decrease in the $CO_2$ capture rate.

Furthermore, in cases where particles of the oxygen-carrying material are carried to the dedusting zone, it is necessary to dimension a large-size fluidized bed so as to allow sufficient time for elutriation separation in the fluidized bed.

In order to remove the ashes produced in the reduction zone without eliminating too many unburnt feedstock particles, the applicant has developed an improvement in this method using a particular reduction zone configuration, with: a first reaction zone operating under dense fluidized bed conditions; a second reaction zone; a fast separation zone for separation of the unburnt solid feedstock particles, the fly ashes and the oxygen-carrying material particles within a mixture coming from the second reaction zone; dedusting of the fumes; a particle stream division zone, part of the particles being directly recycled to the first reaction zone, the other part being sent to an elutriation separation zone so as to recover the ashes and recycle the dense particles to the first reaction zone.

However, ashes can also be carried to the oxidation zone. Indeed, during combustion in the reduction zone, the feedstock degradation produces two types of ashes: either agglomerated bottom ashes that are not transported pneumatically with the entrained metallic oxides bed, or fly ashes that are carried along with the solid bed. Whereas the former ones are readily removed at the fluidized-bed reactor bottom by simple gravity flow, the latter flow together with the oxides and, in the absence of a device controlling their population in the bed, they accumulate therein. The ashes are thus carried from the reduction zone to the oxidation zone, all the more so since no ash population control device is arranged in the reduction zone.

The accumulation of ashes has many consequences and it generates three major drawbacks:
solid flow disturbance through modification of the average grain size of the bed likely to cause control problems as regards the circulation of this solid bed,
dilution of the oxygen-carrying function of the metallic oxides, leading to a decrease in performance of the method,
the risks of agglomeration between ashes or between ashes and metallic oxide particles are increased.

Alternatively or complementarily to the removal of ashes and fines in the reduction zone, a new configuration is provided for the oxidation zone (or air reactor), which allows to use the kinetic energy of the air (oxidizing gas) available during reoxidation of the solid to achieve separation between the oxygen-carrying particles (metallic oxide) and the particles to be removed: ashes and metallic oxide fines, then to achieve separation of the ashes in an enclosure arranged on a solid circulation line, but in a zone where the solid unburnt particles are absent, i.e. downstream from R1 and upstream from R0.

DESCRIPTION OF THE INVENTION

A new oxidation zone configuration comprising the following elements is thus provided:
a reactive zone (or reactive riser) R1 where the oxidation reaction of the particles of oxygen-carrying material coming from reduction zone R0 of the chemical combustion loop takes place,
a gas-solid separation zone S2 allowing dedusting of the fumes coming from the oxidation zone,
a dense phase elutriation separation zone S3 in form of a dense fluidized bed reactor enclosure, optionally complemented by a line for recycling the oxygen-carrying solid from the dense phase of separation zone S3 to the bottom of reactive zone R1, which allows to circulate again the oxide in the oxidation zone and to control the ash population through dense bed elutriation.

SUMMARY OF THE INVENTION

The invention relates to a method for chemical-looping combustion of a hydrocarbon feedstock of solid particles, wherein an oxygen-carrying material circulates in form of particles, comprising:
contacting hydrocarbon feedstock particles with the oxygen-carrying material particles in a reduction zone R0,
contacting oxygen-carrying material particles (1) from reduction zone R0 with an oxidizing gas stream (2) in a reactive oxidation zone R1,
sending transported phase (5) from reactive zone R1 comprising gas and solid to a gas-solid separation zone S2 so as to separate: a predominantly gaseous transported phase (6) comprising fly ashes and oxygen-carrying material fines, and a solid stream (7) comprising the major part of the fines, the fly ashes and the major part of the oxygen-carrying material particles,
sending solid stream (7) from gas-solid separation zone S2 to a dense phase elutriation separation zone S3 fluidized by a non-reducing gas (8) allowing to separate the fines and the fly ashes from the oxygen-carrying material particles so as to send a particle stream (10) comprising the major part of the oxygen carrier particles to reduction zone R0, and to discharge through a discharge line a predominantly gaseous effluent (9) comprising the major part of the fly ashes and of the oxygen-carrying material fines.

In a preferred embodiment, the oxygen-carrying particles are circulated in a loop in reactive zone R1 by means of a line (11) allowing to recycle the oxygen-carrying particles sedimented in the dense fluidized phase from the bottom of separation zone S3 to the lower part of reactive zone R1.

Advantageously, heat is recovered in the dense fluidized phase formed in the bottom of dense phase elutriation separation zone S3 by means of a heat exchanger E4.

Preferably, dense phase elutriation separation zone S3 is fluidized with a fluidization rate ranging between 0.5 and 1 m/s.

Preferably, the oxygen-carrying material particles initially comprise less than 10% particles of diameter below 100 microns.

In a preferred embodiment:
the predominantly gaseous effluent (9) from dense phase elutriation separation zone S3 is sent to a dedusting zone S5 in order to discharge a gas stream (13) containing the major part of the ashes and of the fines and a particle stream (14) comprising the major part of the oxygen-carrying material, said particle stream being sent through a transport line to reduction zone R0.

The invention also relates to a plant for carrying out chemical-looping redox combustion of a solid hydrocarbon feedstock according to the method described above, said plant comprising at least:
- a reduction zone R0,
- a reactive oxidation zone R1 provided with feed means supplying oxygen-carrying particles (1) coming from reduction zone R0, feed means supplying oxidizing fluidization gas (2), and a discharge line for discharging a transported phase (5) comprising gas and solid particles,
- a gas-solid separation zone S2 arranged downstream from reactive zone R1, supplied by said discharge line and comprising a line for discharging a predominantly gaseous transported phase (6) and a discharge line for discharging a solid stream (7) comprising the major part of the oxygen-carrying material,
- a dense phase elutriation separation zone S3 arranged downstream from gas-solid separation zone S2, comprising an intake for said solid stream (7), a line allowing a fluidization gas (8) to be supplied, a line for carrying to reduction zone R0 a solid particle stream (10) rich in oxygen-carrying particles, and a line for discharging a gas stream rich in fly ashes (9).

The plant preferably comprises a heat exchanger E4 in the dense fluidized phase formed in the bottom of dense phase separation zone S3.

The plant preferably comprises a line coming from dense phase separation zone S3 for recycling to reactive zone R1 a particle stream (11) comprising part of the solid particles separated in dense phase elutriation separation zone S3.

The plant can also comprise a dedusting zone S5 downstream from dense phase elutriation separation zone S3, provided with an intake line for receiving a predominantly gaseous effluent (9) coming from separation zone S3, a discharge line allowing to discharge a gas stream (13) containing the major part of the ashes and the fines, and a transport line for carrying to reduction zone R0 a particle stream (14) comprising the major part of the oxygen-carrying material.

LIST OF THE FIGURES

FIG. 1 describes the invention by way of non limitative example.

FIG. 1 shows the general principle of the ash removal device downstream from the oxidation reactor according to the invention.

The invention can be described in general terms as an assembly as shown in FIG. 1.

The device allowing the method according to the invention to be implemented notably comprises:
- a reactive zone R1 where the oxidation reaction of the oxygen-carrying material coming from reduction zone R0 (fuel reactor) of the chemical combustion loop takes place,
- a gas-solid separation zone S2, preferably in form of a cyclone type gas-solid separator, allowing dedusting of the fumes coming from reactive zone R1,
- a dense phase separation zone S3 for separation of the populations of fines, fly ashes and oxygen-carrier particles.

This device is optionally complemented by:
- a heat exchanger E4 for heat extraction by a heat-carrying fluid (12),
- a line for recycling the oxygen-carrying solid (11) from the dense phase of separation zone S3 to the base of reactive zone R1,
- a fumes dedusting zone S5 allowing to achieve deep dedusting of the fines, the fly ashes and the oxygen-carrying material particles, at the outlet of dense phase separation zone S3, in order to discharge a gaseous stream rich in fly ashes and fines, and to recycle a stream of oxygen-carrying material particles to reduction zone R0.

Description of FIG. 1

The oxygen-carrying material (MTO) is in the partly reduced state after reaction with a carbon source that it has contributed, in full or in part, to oxidizing within a combustion reactor referred to as fuel reactor R0. After reaction in reduction zone R0, the oxygen-carrying material in form of a solid particle stream (1) is carried to reactive zone R1 described by the present invention, for example by pneumatic transport, or by dense phase transport in lines, particle transport being controlled by non-mechanical valves of L-type valve for example, in order to be oxidized on contact with air through enrichment of the crystal structure thereof in oxygen atoms. It is this oxidation function on contact with air that enables reactive zone R1 to be referred to as oxidation zone or air reactor. The oxygen-carrying material particle stream (1) is fed through a line into air reactor R1 where the oxygen-carrying material particles are reoxidized on contact with an air stream (2) generally provided in oxygen overstoichiometric proportion of the order of 0% to 20%, preferably 5% to 15%. The reactor geometry is such that the velocity of the gas phase under the reaction conditions in this zone preferably ranges between 3 and 30 m/s, more preferably between 5 and 15 m/s, and the transported oxygen-carrying solid stream generally ranges between 25 and 200 kg/s/m$^2$, preferably between 30 and 100 kg/s/m$^2$ so as to promote good contacting between the gases and the metallic oxide particles. This velocity is sufficient to ensure the pneumatic transport of oxygen-carrying material particles considered in the present invention that belong to group B of Geldart's classification. A reactor in such a configuration can then be referred to as a reactive "riser". The residence time of the solid particles advantageously ranges between 1 s and 1 min, preferably between 2 s and 20 s. During circulation of the oxygen-carrying solid in the chemical loop, it can form fines and thus be partly extracted with the ashes. In order to keep the oxygen-carrying material inventory constant in the unit, for example to make up for the loss of solid through attrition, it is possible to use make-up oxygen-carrying material particles (3) (optional) delivered through a make-up line into reactive zone R1. The major part of the agglomerated ashes, referred to as bottom ashes, as described above form upon combustion of the hydrocarbon feedstock in the fuel reactor where they are removed as they form. However, although these ashes are present in stream (1) in admixture with the oxygen-carrying material particles due to the particular configuration of the invention implementation, they can be eliminated by gravity flow in the bottom of reactive zone R1. The bed ashes are generally not transported pneumatically under the conditions of the method. They are found in the bottom of reactor R1 and they can be extracted through a line (4) feeding extraction means that can be, for example, a cooled endless screw.

Mixed phase (5) coming from reactive zone R1 and comprising fluidization gas and solids is carried to a gas-solid separation device S2 of cyclone type where it is separated into a gas phase and a solid phase with a cut-off threshold typically ranging, for a cyclone, between 10 and 20 μm. The ashes and the fine particles are partly carried along with the gas, while the solid stream comprising the oxygen-carrying material is sent to dense phase separation zone S3. More particularly, two effluents result from this separation:
- a predominantly gaseous transported phase (6) advantageously comprising less than 15% of the ashes coming from gas-solid transported phase (5) and less than 1% of the metallic oxides coming from gas-solid transported phase (5),
- a solid flow (7) rich in oxygen-carrying material advantageously comprising more than 85% of the ashes coming from gas-solid transported phase (5) and more than 99% of the metallic oxides coming from gas-solid transported phase (5), said solid flow feeding separation zone S3.

Dense phase elutriation separation zone S3 can come in form of a dense fluidized bed whose main purpose according to the present invention is to separate the fly ashes from the oxygen-carrying material particles. The reactor is fluidized by a fluidization gas (8) selected from among the gases that are not likely to decrease the degree of oxidation of the oxygen-carrying material, preferably vapour, nitrogen or even air, the latter being likely to contribute to increasing the degree of oxidation of the solid. Potentially reducing gases such as light hydrocarbons, carbon monoxide or hydrogen are preferably avoided. Separation proper is achieved by dense phase elutriation: the velocity of the gas phase in dense phase separation zone S3 is adjusted in such a way that the oxygen-carrying material particles, bigger and denser than the ashes, remain in the fluidized bed, and the fly ashes, less dense and smaller than the oxygen-carrying material particles, are carried along with the gas phase through pneumatic transport. In general terms, the gas velocity ranges between 0.3 and 1.5 m/s, preferably between 0.4 and 1 m/s, so as to reach entrained particle flux values ranging between 0.01 and 5 kg/s/m², preferably between 0.05 and 0.5 kg/s/m². Two effluents are obtained, a gaseous effluent (9) comprising a mixture of particles rich in fly ashes containing less than 30 wt. % oxygen-carrying material particles, preferably less than 15% oxygen-carrying material particles, and a solid flow (10) rich in oxygen-carrying material particles comprising less than 5 wt. % ashes, preferably less than 1 wt. % ashes.

Optionally, a solid stream (11) can be sent from dense phase elutriation separation zone S3 to reactive oxidation zone R1. This recycling has the effect of:
- circulating the oxygen-carrying material in a loop in the reactive oxidation zone so as to maximize the degree of oxidation thereof,
- circulating again the ashes that have remained mixed with the oxygen-carrying material through gas-solid separation zone S2 and dense phase elutriation separation zone S3.

Optionally, a heat exchanger E4 can be arranged within the dense fluidized phase formed in the bottom of separation zone S3 through the accumulation of oxygen-carrying material particles. A heat-carrying fluid (12) circulates in exchanger E4, either as a purely single-phase (gas or liquid) flow or, if vapour is to be generated and the heat exchange is to be maximized, in entirely or partly vaporized form.

In dense phase elutriation separation zone S3, the dense phase fluidized bed thus advantageously has a secondary function such as control of the oxygen carrier circulation around the air reactor, and/or oxygen carrier oxidation complement if the gas selected for fluidization is oxidizing, and/or a heat recovery function.

Advantageously, the separation achieved in dense phase separation zone S3 can be complemented by arranging, downstream from zone S3, a fumes dedusting zone in form of a gas-solid separator S5, a cyclone for example. In this embodiment, the gaseous effluent rich in fly ashes (9) comprising advantageously less than 30 wt. % oxygen carrier particles and preferably less than 15 wt. % oxygen carrier particles, coming from dense phase elutriation separation zone S3, is sent to dedusting zone S5. A gaseous transported stream (13) predominantly comprising fly ashes and fines is thus obtained, as well as a solid stream (14) comprising the major part of the oxygen-carrying material particles from gaseous effluent (9) that is sent to reduction zone R0 of the chemical loop. Solid stream (14) can be combined with solid stream (10) coming from dense phase separation zone S3, in a common delivery line of reduction zone R0.

Preferably, the oxygen-carrying material (in most cases a metallic oxide) injected into the plant initially contains less than 10% particles of diameter below 100 microns, which allows easy separation of the ashes and of the metallic oxide by elutriation.

EXAMPLE

The example relates to FIG. 1, without optional recycling of stream (11) and heat recovery E4, in the preferred embodiment using a fumes dedusting zone S5, a cyclone here.

We consider here a chemical loop wherein an oxygen-carrying metallic oxide circulates with a gross thermal power of the order of 300 MWth, i.e. a solid circulation equivalent to 1077 kg/s.

We consider the combustion of a coal containing 14% ashes feeding the unit at a rate of 11.6 kg/s. The coal is supplied in the fuel reactor with a grain size characterized by the fact that less than 2% of the coal has a particle size above 200 microns.

The oxygen carrier used is a solid of ilmenite type with a density close to 5000 kg/m³.

The present example relates to the removal of ashes at the air reactor outlet according to the present invention, in such a way that the ashes removed are equivalent, in mass flow rate, to the flow of ashes entering the unit (corresponding to the ashes of the feedstock supplied on a continuous basis), i.e. a flow of ashes to be removed of 1.62 kg/s. By hypothesis, the ashes are only removed at the level of dense phase elutriation separation zone S3 as described in FIG. 1 after passage through a cyclone S2.

The grain size populations of the ashes and of the oxygen-carrying material are given in Table 2 hereafter:

TABLE 2

Grain size of the various particles circulating in the plant

| dpmin μm | dpmax μm | Oxide wt. % | Ashes wt. % |
|---|---|---|---|
| 0 | 5 | 0.00 | 10.80 |
| 5 | 10 | 0.00 | 15.74 |
| 10 | 15 | 0.00 | 12.16 |
| 15 | 20 | 0.00 | 9.78 |
| 20 | 25 | 0.00 | 8.01 |
| 25 | 30 | 0.00 | 6.63 |
| 30 | 35 | 0.00 | 5.53 |
| 35 | 40 | 0.00 | 4.64 |
| 40 | 45 | 0.00 | 3.91 |
| 45 | 50 | 0.00 | 3.30 |
| 50 | 60 | 0.00 | 4.03 |
| 60 | 70 | 0.02 | 4.06 |
| 70 | 80 | 0.13 | 2.96 |
| 80 | 90 | 0.50 | 2.17 |
| 90 | 100 | 1.35 | 1.60 |
| 100 | 125 | 6.07 | 1.86 |
| 125 | 150 | 18.53 | 1.44 |
| 150 | 175 | 24.22 | 0.70 |
| 175 | 200 | 20.87 | 0.35 |
| 200 | 250 | 18.25 | 0.22 |
| 250 | 300 | 8.06 | 0.09 |
| 300 | 350 | 1.65 | 0.02 |
| 350 | 400 | 0.29 | 0.01 |
| 400 | 450 | 0.05 | 0.00 |
| 450 | 500 | 0.01 | 0.00 |
| 500 | 750 | 0.00 | 0.00 |
| 750 | 1000 | 0.00 | 0.00 |

The particle properties and the terminal settling velocities (Ut in m/s) as a function of the mean particle diameter (dp in μm) for the ashes and the oxygen-carrying material are given in Table 3 hereafter.

TABLE 3

Particle properties and terminal settling velocities (Ut in m/s) as a function of the mean particle diameter (dp in μm) for the ashes and the oxygen-carrying material.

| | Ashes | Oxygen-carrying material |
|---|---|---|
| $\rho g$ | 0.36 | 0.36 |
| $\rho p$ | 2500 | 5000 |
| $\mu g$ | 0.000048 | 0.000048 |
| dp μm | Ut | Ut |
| 10 | 3.00E−03 | |
| 25 | 1.70E−03 | |
| 50 | 6.90E−03 | 0.138 |
| 75 | 0.155 | 0.31 |
| 100 | 0.276 | 0.54 |
| 150 | 0.589 | 1.08 |
| 200 | 0.94 | 1.67 |

With $\rho g$ the gas density in kg/m$^3$, $\rho p$ the solids density in kg/m$^3$ and $\mu g$ the gas viscosity in Pa·s.

The transported phase from oxidation zone R1 is sent in a stream (5) to cyclone S2. The solid recovery efficiency thereof is such that:
  95 mass % of the ashes from stream (5) are found in solid stream (7),
  99.98 mass % of the metallic oxides from stream (5) are found in solid stream (7).

Stream (7) is sent to dense fluidized bed separator S3 with a carrier gas (8) velocity of 0.75 m/s. In this reactor, 50% of the ashes and 20% of the metallic oxide fines population are entrained, which results in an entrained gas stream (9) comprising 5.3 mass % of the metallic oxide stream from solid stream (7) and 47 mass % of the ashes from solid stream (7).

This stream (9) is then sent to a cyclone S5 with a solid recovery efficiency such that:
  91 mass % of the ashes from transported phase (5) are found in stream (14),
  99.8 mass % of the metallic oxides from transported phase (5) are found in stream (14).

This results in an ashes removal equivalent to 9.1% of the initial mass flow of ashes and a metallic oxide fines removal equivalent to 0.02% of the initial mass flow.

This capacity for eliminating ashes allows to limit the proportion of ashes present in the bed. Thus, at the power selected, the device has to remove 1.67 kg/s ashes, which corresponds to a mass flow rate of ashes in stream (5) of 18.3 kg/s, i.e. 1.7 mass % of the total flow of oxygen-carrying material and ashes (5). For the oxygen-carrying material stream, this leads to a fines removal in a proportion of 0.17 kg/s oxygen-carrying material for stream (11), which adds up to the 1.67 kg/s removed ashes.

In conclusion, a stream (13) rich in ashes in a proportion of 90.7% is obtained and the proportion of ashes in the circulating bed is kept at 1.7 mass %.

The invention claimed is:

1. A method for chemical-looping combustion of a hydrocarbon feedstock of solid particles, wherein an oxygen-carrying material circulates in form of particles, comprising:
    contacting hydrocarbon feedstock particles with the oxygen-carrying material particles in a reduction zone R0,
    contacting the oxygen-carrying material particles from the reduction zone R0 with an oxidizing gas stream in a reactive oxidation zone R1,
    sending a transported phase from the reactive zone R1 comprising gas and solid to a gas-solid separation zone S2 so as to separate: a predominantly gaseous transported phase comprising fly ashes and oxygen-carrying material fines, and a solid stream comprising the major part of the fines, the fly ashes and the major part of the oxygen-carrying material particles,
    sending the solid stream from the gas-solid separation zone S2 to a dense fluidized phase elutriation separation zone S3 fluidized by a non-reducing gas allowing to separate the fines and the fly ashes from the oxygen-carrying material particles so as to send a particle stream comprising the major part of the oxygen carrier particles to the reduction zone R0, and to discharge through a discharge line a predominantly gaseous effluent comprising the major part of the fly ashes and of the oxygen-carrying material fines.

2. A method as claimed in claim 1, wherein the oxygen-carrying particles are circulated in a loop in the reactive zone R1 by means of a line allowing to recycle the oxygen-carrying particles sedimented in the dense fluidized phase from the bottom of the separation zone S3 to a lower part of the reactive zone R1.

3. A method as claimed in claim 1, wherein heat is recovered in the dense fluidized phase formed in the bottom of the dense fluidized phase elutriation separation zone S3 by means of a heat exchanger E4.

4. A method as claimed in claim 1, wherein dense fluidized phase elutriation separation zone S3 is fluidized with a fluidization rate ranging between 0.5 and 1 m/s.

5. A method as claimed in claim 1, wherein the oxygen-carrying material particles initially comprise less than 10% particles of diameter below 100 microns.

6. A method as claimed in claim 1, wherein:
the predominantly gaseous effluent from dense fluidized phase elutriation separation zone S3 is sent to a dedusting zone S5 in order to discharge a gas stream containing the major part of the ashes and of the fines and a particle stream comprising the major part of the oxygen-carrying material, said particle stream being sent through a transport line to reduction zone R0.

7. A plant for carrying out chemical-looping redox combustion of a solid hydrocarbon feedstock according to the method as claimed in claim 1, said plant comprising at least:
a reduction zone R0,
a reactive oxidation zone R1 provided with feed means supplying oxygen-carrying particles coming from the reduction zone R0, feed means supplying oxidizing fluidization gas, and a discharge line for discharging a transported phase comprising gas and solid particles,
a gas-solid separation zone S2 arranged downstream from the reactive zone R1, supplied by said discharge line and comprising a line for discharging a predominantly gaseous transported phase and a discharge line for discharging a solid stream comprising the major part of the oxygen-carrying material,
a dense phase elutriation separation zone S3 arranged downstream from gas-solid separation zone S2, comprising an intake for said solid stream, a line allowing a fluidization gas to be supplied, a line for carrying to the reduction zone R0 a solid particle stream rich in oxygen-carrying particles, and a line for discharging a gas stream rich in fly ashes.

8. A plant as claimed in claim 7, comprising a heat exchanger E4 in a dense fluidized phase formed in a bottom of the dense fluidized phase elutriation separation zone S3.

9. A plant as claimed in claim 7, comprising a line coming from the fluidized dense phase elutriation separation zone S3 for recycling to the reactive zone R1 a particle stream comprising part of the oxygen-carrying particles separated in the dense phase elutriation separation zone S3.

10. A plant as claimed in claim 7, comprising a dedusting zone S5 downstream from the dense phase elutriation separation zone S3, provided with an intake line for receiving a predominantly gaseous effluent coming from the dense phase elutriation separation zone S3, a discharge line allowing to discharge a gas stream containing the major part of the ashes and the fines, and a transport line for carrying to the reduction zone R0 a particle stream comprising the major part of the oxygen-carrying material.

* * * * *